United States Patent [19]

Robitaille

[11] Patent Number: 4,811,600
[45] Date of Patent: Mar. 14, 1989

[54] DEVICE FOR MAKING FLOWMETER TAMPERPROOF

[75] Inventor: Thierry Robitaille, Mulhouse, France

[73] Assignee: Sappel, Saint-Louis, France

[21] Appl. No.: 41,435

[22] Filed: Apr. 15, 1987

[30] Foreign Application Priority Data

Apr. 21, 1986 [FR] France ................... 86.05683

[51] Int. Cl.$^4$ ............................................. G01F 15/14
[52] U.S. Cl. ..................... 73/272 R; 73/201;
73/273; 73/431; 215/228
[58] Field of Search ............ 73/273, 272 R, 431,
73/201; 215/228

[56] References Cited

U.S. PATENT DOCUMENTS 4,663,970  5/1987  Sutherland ................. 73/273

Primary Examiner—Joseph A. Orsino
Assistant Examiner—Kenneth Tso
Attorney, Agent, or Firm—Browdy and Neimark

[57] ABSTRACT

A device of the antifraud sealing cap type in the form of a unit having: a covering skirt (5) provided on the inside face of its upper edge with recesses extended downward by hooks (9) able to engage in shoulder (3) of threaded lock nut (2) provided on the body of the meter; a ring with an inside vertical lip (10) whose pin (11) projecting from the collar come to be inserted in said recesses (8); and a cover (12) whose opening and closing hinge (13) is pivoted in an opening made on the upper edge of the skirt. The device is particularly useful for antifraud covering of water meters.

4 Claims, 1 Drawing Sheet

DEVICE FOR MAKING FLOWMETER TAMPERPROOF

BACKGROUND OF THE INVENTION

This invention relates to the field of devices making it possible to seal or protect measuring or monitoring systems from fraud. It relates very particularly to a means for tamperproofing of flowmeters.

Flowmeters, as, for example, water meters, comprise in the upper part of their cylindrical body—where the measuring means, including the counter, are introduced—a closing ring in the form of a threaded nut which is provided with a tamperproof system, generally of the security lead type, intended to monitor fraud.

Despite these precautions, the guarantees often prove inadequate and checks or meter readers are often brought to provide resetting interventions of sealing systems and of lock nuts which assure closing of meter housings.

The object of the invention is to mitigate these drawbacks. The invention proposes for this purpose a cap, with cover, for a flowmeter, intended not only to assure a sealing function against fraud but further making it possible, on the one hand, to assure a protective covering for the meter and, on the other hand, thanks to the design of its internal structure, to orient the reading face toward the user during a reading.

The new device according to the invention is of the cap type, and consists essentially of the combination of (a) a cylindrical skirt provided on the inside face of its upper edge with a series of recesses regularly spaced on the periphery and having hooks extending vertically, perpendicular to the skirt, to engage the shoulder of the standard threaded lock nut for the meter, (b) a ring with a vertical lip having outward projections extending into said recesses, and (c) a cover whose opening and closing hinge is pivoted in an opening made on the upper edge of the skirt.

The hooks are intended to assure a locking over the entire periphery of the threaded nut of the meter, while the ring serves to drive in rotation the meter counter thanks to its inside lip.

According to an important characteristic of the device, one of said hooks is made fragile at the level of the SIM (Service of Instruments and Measurements) check point which is provided on the head of said hook, at the level of the upper edge of the skirt. Thus, during a strong traction on the cover or on the closing ring, the pointed hook can break, which makes it possible to detect an attempted fraud, without thereby damaging the tamperproofing of the meter.

Other characteristics are seen from the following description, relating to a nonlimiting embodiment shown by the accompanying drawings which diagramatically represent:

DESCRIPTION OF PREFERRED EMBODIMENTS

Figure 2:
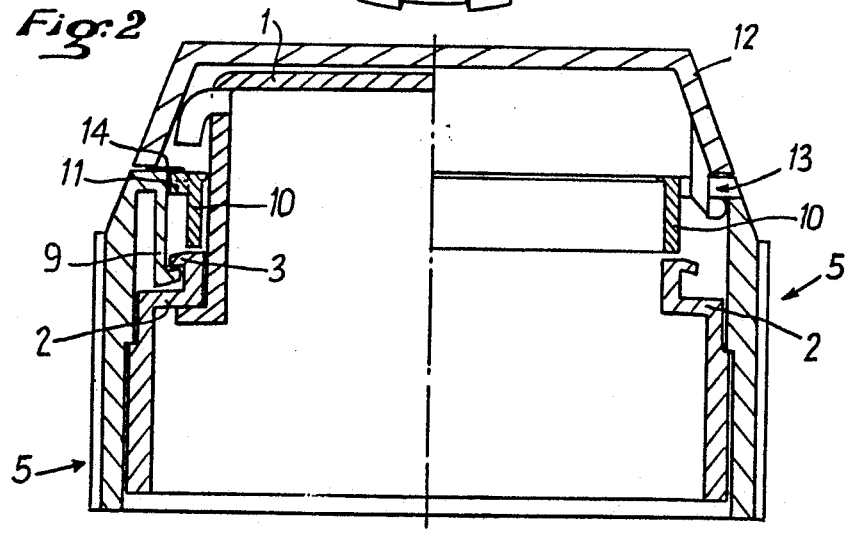
FIG. 2 shows a more detailed view, in section, of the structural characteristics of the device according to the invention.

It will be noted that only the left part of FIG. 2 completely reproduces the elements of the meter itself (known per se), including essentially the glass of the inside counter 1 and threaded lock nut 2 assuring the closing of the meter. A small shoulder 3 or groove is made in the upper part of this nut 2 to allow locking of the hooks therewith., as explained below. Further, plane part 4 of nut 2 is generally coated with grease during placement of the cap of the invention.

According to the figures, the protective device according to the invention comprises an outside cover or skirt 5, with outside ribs 6, whose upper edge 7 is advantageously notched, and which is provided with a series of recesses 8 distributed on the internal periphery. The inside wall of these recesses extends vertically to form hooks 9 which are intended, by their angled bottom portion or base, to lock on the periphery of the groove provided, as indicated above, on the lock nut of the meter itself.

A ring with a vertical inside lip 10, is provided with an upper collar whose projecting pins 11 come to engage in the recesses 8 of the upper edge of the skirt 5. At the level of notches 7 of this upper edge are provided inside braces (not shown in the figures), which serve as means for holding the collar of the ring downward.

Figure 1:
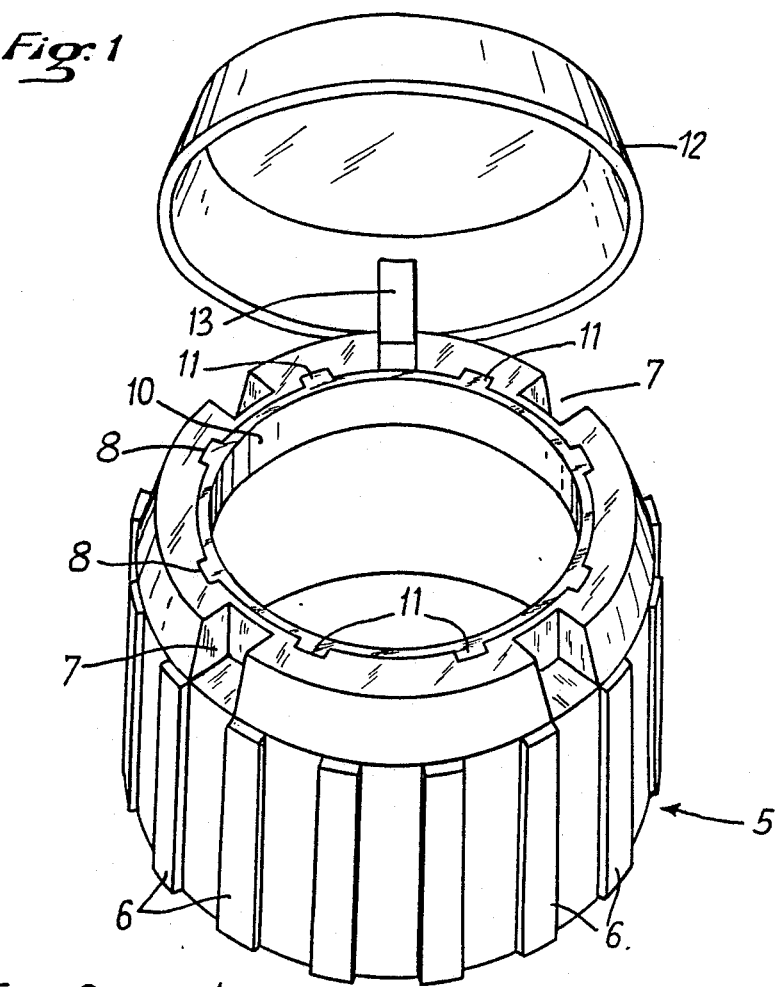
FIG. 1 shows a top view, slightly in perspective, of a cap according to the invention, with its cover raised.

The device further comprises a cover 12 able to adopt a completely open position (as in FIG. 1) when lifted up or a closed position (as in FIG. 2), thanks to a pivot hinge 13 consisting of a lug, made for instance in one piece with the cover, and whose extended base is held in an opening made on the upper edge of the skirt.

According to another characteristic of the present invention, an SIM check point (see above), indicated by 14 in the left part of FIG. 2, is placed at the level of one of the recesses 8. This one recess corresponds to an underlying hook 9 that is more fragile than the others so that it can break in case of attempted tampering.

Advantageously, all the parts of the cap type device according to the invention can be made as one unit of molded or injected plastic. The unit is easy to install, by being firmly fastened to the body of the meter as a result of the locking of hooks 9 on the shoulder 3 of the upper part of the threaded nut 2, this nut being locked by strong screwing on the meter.

The invention, of course, is not limited to the embodiment described above and extends to all equivalent means with the same function and giving similar results.

I claim:

1. A tamperproof device for covering a flowmeter having a standard threaded lock nut (2) with a shoulder (3), comprising
    a cylindrical skirt (5) having a series of recesses (8) regularly spaced on the periphery of an upper edge of an inside face thereof, and having hooks (9) extending vertically downwardly from the surfaces of said recesses (8), perpendicular to the skirt (5), to engage said shoulder (3) of said standard threaded lock nut (2),
    a ring with externally projecting pins (11) engaging with the recesses (8), and
    a cover (12) with an opening and closing hinge (13) pivoted in an opening in said upper edge of the skirt (5).

2. The device of claim 1, wherein a check point (14) is provided at the level of recess (8) overhanging a respective one of said hooks (9) which is provided to be more fragile than the others, to detect fraud in case of strong traction on said cover (12) or ring.

3. The device of claim 1, wherein said skirt (5), ring and cover (12) are made as a unit of plastic.

4. The device of claim 2, wherein said skirt (5), ring and cover (12) are made as a unit of plastic.

* * * * *